US009551782B2

(12) United States Patent
Yanagi et al.

(10) Patent No.: US 9,551,782 B2
(45) Date of Patent: Jan. 24, 2017

(54) RADAR APPARATUS AND METHOD OF MEASURING RADAR PERFORMANCE

(71) Applicant: FURUNO Electric Company Limited, Nishinomiya, Hyogo (JP)

(72) Inventors: Katsuyuki Yanagi, Nishinomiya (JP); Yoshifumi Ohnishi, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 452 days.

(21) Appl. No.: 14/288,055

(22) Filed: May 27, 2014

(65) Prior Publication Data
US 2014/0354468 A1 Dec. 4, 2014

(30) Foreign Application Priority Data

May 31, 2013 (JP) .................................. 2013-115568

(51) Int. Cl.
*G01S 7/40* (2006.01)
*G01S 13/93* (2006.01)

(52) U.S. Cl.
CPC ............ *G01S 7/4008* (2013.01); *G01S 7/4021* (2013.01); *G01S 13/9307* (2013.01)

(58) Field of Classification Search
CPC ... G01S 7/4008; G01S 7/4021; G01S 13/9307
USPC .................................................. 342/173–174
See application file for complete search history.

(56) References Cited

U.S. PATENT DOCUMENTS

| 7,541,970 | B1 * | 6/2009 | Godfrey | ............... G01S 7/2813 342/165 |
| 2008/0100503 | A1 * | 5/2008 | Yanagi | ................... G01S 7/064 342/176 |
| 2009/0135051 | A1 * | 5/2009 | Bishop | .................... G01S 13/89 342/175 |
| 2012/0249363 | A1 * | 10/2012 | Kolinko | ............ H01Q 21/0043 342/179 |
| 2014/0354468 | A1 * | 12/2014 | Yanagi | ................. G01S 7/4008 342/173 |

FOREIGN PATENT DOCUMENTS

| DE | 102013109279 A1 * | 2/2014 | ......... G01S 7/4004 |
| JP | 2011-117808 A | 6/2011 | |
| JP | 2011-117809 A | 6/2011 | |
| JP | 2014235041 A * | 12/2014 | |

* cited by examiner

*Primary Examiner* — John B Sotomayor
(74) *Attorney, Agent, or Firm* — Global IP Counselors, LLP

(57) ABSTRACT

A radar apparatus is provided. The radar apparatus includes a transmitter configured to transmit radar signals via a radar antenna, a receiver configured to receive reflection waves that are echoes of the radar signals, via the radar antenna, a radar image generating module configured to generate a radar image based on the reflection waves received by the receiver, a performance monitor configured to measure performance of at least one of the transmitter and the receiver, and a controller configured to cause the performance monitor to perform the measurement while the transmission of the radar signals is suspended.

18 Claims, 7 Drawing Sheets

RADAR APPARATUS AND METHOD OF MEASURING RADAR PERFORMANCE

CROSS-REFERENCE TO RELATED APPLICATION(S)

This application claims priority under 35 U.S.C. §119 to Japanese Patent Application No. 2013-115568, which was filed on May 31, 2013, the entire disclosure of which is hereby incorporated by reference.

TECHNICAL FIELD

The present invention generally relates to a radar apparatus, which is provided with a radar performance monitor for measuring performance of a transmitter and a receiver of the radar apparatus.

BACKGROUND OF THE INVENTION

Transmitters (e.g., magnetrons) and receivers (e.g., electronic components of reception circuits) provided in radar apparatuses may deteriorate as being used, or be damaged by a strong signal received externally. Thus, there has been a case where a radar performance monitor is provided to such a radar apparatus in order to check if the transmission intensity and the reception sensitivity of the radar apparatus are good.

This kind of radar apparatus generally includes a radar unit and a PM unit. The radar unit transceives radar signals and generates a radar image. The PM unit receives a radar signal transmitted from the radar unit and measures the transmission intensity. Moreover, the PM unit transmits a performance signal (hereinafter, referred to as the PM signal) after receiving the radar signal. The radar unit receives and analyzes the PM signal to measure the reception sensitivity of the radar apparatus. Each of JP2011-117808A and JP2011-117809A discloses such kind of radar apparatus provided with a performance monitor.

In the radar apparatus of JP2011-117808A, a transception circuit of the radar unit and a transception circuit of the PM unit are commonalized. Moreover, the radar apparatus can switch its mode between a mode in which the radar image is generated by transceiving the radar signals and a mode in which the transmission intensity and the reception sensitivity of the radar apparatus are measured as described above.

Here, in the case of measuring the performance of the radar apparatus by switching the mode as disclosed in JP2011-117808A, there is a disadvantage that the radar image cannot be updated while the performance of the radar apparatus is measured. The radar apparatus disclosed in JP2011-117809A solves this disadvantage.

In the radar apparatus of JP2011-117809A, similarly to the radar apparatus in JP2011-117808A, a transception circuit of the radar unit and a transception circuit of the PM unit are commonalized. Moreover, radar apparatuses generally detect, based on a time length from a transmission of a radar signal to a reception of the radar signal (an echo), a distance of the received echo. The radar apparatus of JP2011-117809A performs a transception of a PM signal and measures the performance of the radar apparatus after a period of time for the radar signal to travel a distance corresponding to the display distance range of the display unit from its transmission, but before the next radar signal is transmitted.

However, with the radar apparatus in JP2011-117809A, there has been a problem that a transmission cycle of the radar signal becomes slow. Especially when a radar signal with a long pulse width is transmitted for long distance detection, since a detection range in an azimuth direction becomes wider, a problem arises that the echo cannot be detected in a large area.

Moreover, in the radar apparatus of JP2011-117809A, even if the transmission cycle of the radar signal is shortened by sacrificing the reflection echo of the radar signal from a long distance area, a problem arises that a target at a distant location from the radar apparatus cannot be displayed.

SUMMARY OF THE INVENTION

The present invention is made in view of the above situations, and mainly aims to provide a radar apparatus, which measures performance of the radar apparatus while minimizing influence of the measurement on the radar image.

According to one aspect of the present invention, a radar apparatus having the following configuration is provided. That is, the radar apparatus includes a transmitter configured to transmit radar signals via a radar antenna, a receiver configured to receive reflection waves that are echoes of the radar signals, via the radar antenna, a radar image generating module configured to generate a radar image based on the reflection waves received by the receiver, a performance monitor configured to measure performance of at least one of the transmitter and the receiver, and a controller configured to cause the performance monitor to perform the measurement while the transmission of the radar signals is suspended.

Thus, the performance of at least one of the transmitter and the receiver can be measured without stopping the update of the radar image. Moreover, by suspending the transmission of the radar signal, the performance of the radar apparatus can be measured at an arbitrary timing during the transception of the radar signal (e.g., a timing with less influence on the radar image).

The controller may recognize, in the radar image, either one of an azimuth range and a distance in the radar image where the echo is not detected or the number of detected echoes is less than other azimuths or distances, and at a timing corresponding to the either one of the azimuth range and the distance, the controller may cause the performance monitor to perform the measurement.

Thus, an operator can confirm the performance of, for example, the transmitter while suppressing the influence on the radar image.

The controller may detect the either one of the azimuth range and the distance where the echo is not detected or the number of detected echoes is less than other azimuths or distances based on the radar image data obtained in a scan immediately before a latest scan performed by the radar apparatus.

Since the existence of the echo is determined based on the immediately previous data as described above, an accurate detection result can be obtained.

The performance monitor may transmit a performance signal for measuring the performance of the receiver. The radar image generating module may compensate for the radar image that is not acquired while the performance signal is transmitted, with other radar image data.

Thus, even within an area where the transmission of the radar signal is suspended, a situation around the radar apparatus can be displayed as the radar image.

The other radar image data may be radar image data obtained in a scan immediately before a latest scan performed by the radar apparatus.

Since the radar image can be compensated based on the immediately previous data as described above, even highly adequate information of the area where the transmission of the radar signal is suspended can be displayed.

The radar apparatus may include a display unit configured to display, along with the radar image generated by the radar image generating module, a chart indicating a time transition of the measured performance of at least one of the transmitter and the receiver.

Thus, the operator can instinctively grasp the time transition of the performance of, for example, the transmitter. Therefore, for example, it can easily be confirmed that it is required to replace a magnetron. Moreover, since the chart is displayed along with the radar image, the operator can confirm, for example, that it is required to replace the magnetron while confirming target(s) around the radar apparatus (i.e., without switching the display).

The radar apparatus may include a performance determining module configured to determine whether the performance of at least one of the transmitter and the receiver measured by the performance monitor satisfies a predetermined reference level, and a notifier configured to, when the performance determining module determines that the predetermined reference level is not satisfied, notify that the at least one of the transmitter and the receiver requires to be replaced or soon to be replaced.

Thus, the operator can grasp the replacing time of, for example, the transmitter, without determining the performance of the transmitter himself/herself.

The radar apparatus may include a communication interface. The notifier may transmit at least one of the measurement result of the performance monitor and the determination result of the performance determining module outside via a communication line.

Thus, by notifying an outside component supplier that, for example, the transmitter requires to be replaced, the corresponding component can be prepared in advance.

The radar apparatus may be installed in a movable body. The performance monitor may be disposed in the movable body, rearward of the radar antenna.

Thus, since importance of displaying an echo from a target located rearward of the movable body is low, the operator can confirm the performance of, for example, the transmitter while suppressing the influence on the radar image.

The radar apparatus may include a timer in which a timing to measure the performance of at least one of the transmitter and the receiver is set in advance and configured to, when the timing comes, output a signal indicating that it is the timing to measure, to the performance monitor.

Thus, for example, the performance of, for example, the transmitter can be measured and confirmed periodically, and therefore, the management on the operator side can be omitted.

According to another aspect of the present invention, the following method of measuring radar performance is provided. That is, the radar performance measuring method includes transmitting radar signals via a radar antenna, receiving reflection waves that are echoes of the radar signals, via the radar antenna, generating a radar image based on the received reflection waves, and measuring performance of at least one of a transmitter and a receiver of the radar signals while the transmission of the radar signals is suspended.

Thus, the performance of at least one of the transmitter and the receiver can be measured without stopping the update of the radar image. Moreover, by suspending the transmission of the radar signal, the performance signal can be transmitted at an arbitrary timing during the transception of the radar signal (e.g., a timing with less influence on the radar image).

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
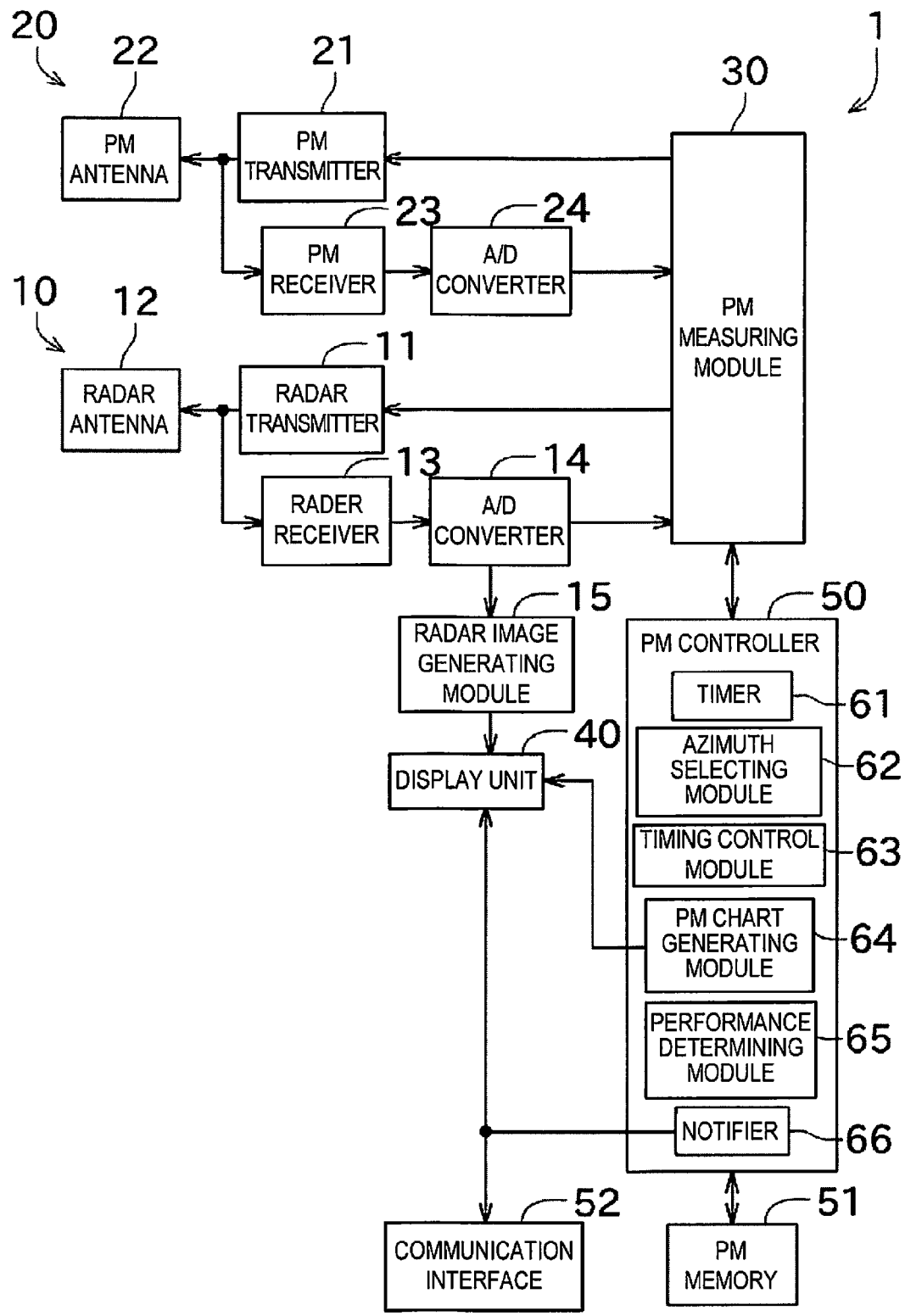
FIG. 1 is a block diagram illustrating a configuration of a radar apparatus according to one embodiment of the present invention.
Figure 2:
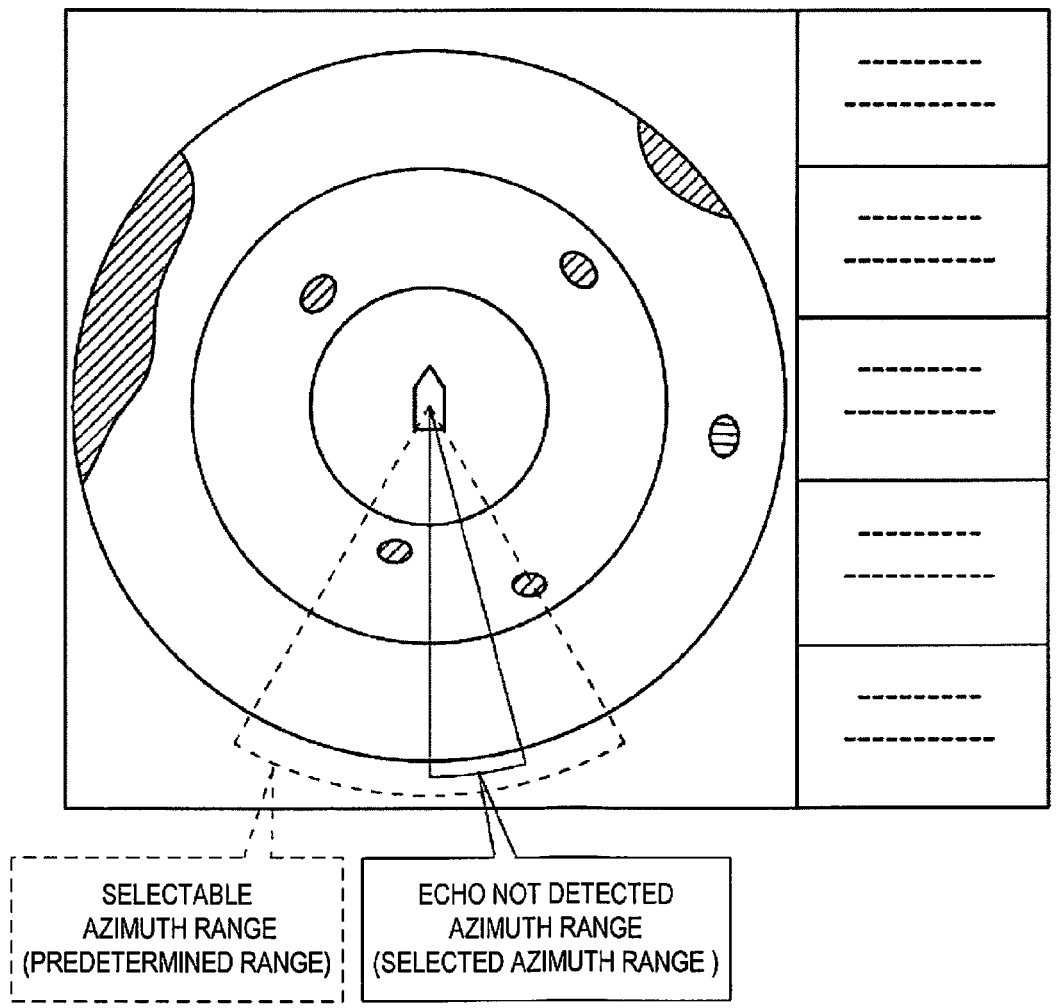
FIG. 2 is a view illustrating an image displayed on a display unit in a normal mode.

Next, one embodiment of the present invention is described with reference to the accompanying drawings. FIG. 1 is a block diagram illustrating a configuration of a radar apparatus according to this embodiment of the present invention. FIG. 2 is a view illustrating an image displayed on a display unit in a normal mode.

The radar apparatus 1 of this embodiment is installed in a ship (hereinafter, may be referred to as "the ship concerned" or simply as "the ship) and detects a position of a target by transmitting a short-pulse radio wave (radar signal) and analyzing a reflection wave (echo) of the radar signal. The radar apparatus 1 includes a radar unit 10 for transceiving the radar signal, a PM unit 20 (radar performance monitor) for measuring performance of the radar unit 10, a PM measuring module 30, and a display unit 40. Note that the term "target" as used herein refers to any objects or lives that are detectable by the radar apparatus 1.

The radar unit 10 includes a radar transmitter 11 (transmitter), a radar antenna 12, a radar receiver 13 (receiver), an A/D converter 14, and a radar image generating module 15.

The radar transmitter 11 includes an oscillator comprised of a magnetron, and the oscillator generates a high-frequency pulse signal (radar signal) at a predetermined cycle. The radar signal generated by the radar transmitter 11 is outputted to the radar antenna 12.

The radar antenna 12 transmits externally the radar signal inputted from the radar transmitter 11 while revolving in a horizontal plane at a predetermined rotation cycle. With the above configuration, the radar antenna 12 can transmit such radar signals over 360° centering on the ship. Moreover, the radar antenna 12 receives the reflection wave which is the transmitted radar signal reflected on the target.

Note that, in order to separate the path of the radar signal to be transmitted and the reflection wave, a circulator (not illustrated) or the like is provided at a branching point from the radar antenna 12 to the radar transmitter 11/the radar receiver 13.

The radar receiver 13 receives the reflection wave and performs signal processing, such as amplification, extraction of a predetermined frequency band. The radar receiver 13 outputs the processed reflection wave to the A/D converter 14.

The A/D converter 14 converts the inputted reflection wave from analog to digital. The A/D converter 14 outputs the converted reflection wave to the radar image generating module 15 and the PM measuring module 30.

The radar image generating module 15 generates a radar image based on the inputted reflection wave. Specifically, the radar image generating module 15 obtains a distance from the radar antenna 12 to the target based on a time difference between a timing at which the radar antenna 12 transmits the radar signal and a timing at which the radar antenna 12 receives the reflection wave thereof. Moreover, the radar image generating module 15 acquires an azimuth of the target based on the orientation of the radar antenna 12 when the radar signal is transmitted. Thus, the radar image generating module 15 generates the radar image.

Moreover, the radar image generating module 15 displays the generated radar image on the display unit 40 comprised of a liquid-crystal display. FIG. 2 illustrates one example of the radar image generated by the radar image generating module 15. In the radar image of FIG. 2, a mark displayed at the center indicates a position of the ship and hatched sections indicate echoes of the targets.

The PM unit 20 has a configuration for measuring the performance of the radar unit 10. Similarly to the radar unit 10, the PM unit 20 includes a PM transmitter 21, a PM antenna 22, a PM receiver 23, and an A/D converter 24. The PM antenna 22 is disposed in the ship, rearward of the radar antenna 12. Note that, the description of the configurations of the respective components of the PM unit 20 is omitted since it is substantially the same as that of the radar unit 10.

The PM measuring module 30 controls the radar unit 10 and the PM unit 20 at a predetermined timing (a timing at which a trigger signal of a timer 61 described later is inputted) to measure a transmission intensity and a reception sensitivity of the radar unit 10.

Specifically, in a case of measuring the performance of the radar unit 10, the PM measuring module 30 first causes the radar unit 10 to transmit the radar signal. The PM antenna 22 of the PM unit 20 receives the radar signal, and outputs it to the PM measuring module 30 via the PM receiver 23 and the A/D converter 24. The PM measuring module 30 measures the transmission intensity of the radar unit 10 by analyzing the radar signal.

Moreover, the PM measuring module 30, in response to the radar signal being received by the PM unit 20, causes the PM transmitter 21 to generate a PM signal. Here, for example, the PM signal includes a plurality of pulse signal elements transmitted at a predetermined interval and the signal level is set to be lower for the pulse signal element transmitted later.

The radar antenna 12 of the radar unit 10 receives the PM signal and outputs it to the PM measuring module 30 via the radar receiver 13 and the A/D converter 14. The PM measuring module 30 measures the reception sensitivity of the radar unit 10 by analyzing the PM signal.

Note that, although the PM unit 20 transmits the PM signal in response to the reception of the radar signal as described above, here, it may be such that, by changing the transmission timing of the PM signal or lowering the intensity of the PM signal according to the intensity of the radar signal, the PM unit can let the radar unit 10 confirm its transmission intensity.

Moreover, in the description above, the PM unit 20 transmits the PM signal in response to the reception of the radar signal; however, the following configuration may be adopted. Specifically, the PM measuring module 30 calculates a timing to start transmitting the PM signal based on the transmission timing of the radar signal, and controls the PM unit 20 to start transmitting the PM signal at the calculated timing.

Moreover, the radar unit 10 includes a PM controller 50 (controller), a PM memory 51, and a communication interface 52.

The PM controller 50 controls an operation timing of the PM measuring module 30 (timing of causing the PM unit 20 to perform the measurement), and performs control regarding the performance of the radar unit 10 measured by the PM unit 20. The PM controller 50 includes a timer 61, an azimuth selecting module 62, a timing control module 63, a PM chart generating module 64, a performance determining module 65, and a notifier 66.

The timer 61 generates a trigger signal indicating a timing to measure the performance of the radar unit 10. The azimuth selecting module 62 selects, as described later in detail, an azimuth range in which the echo is not detected (or a less number of echoes are detected). The timing control module 63 operates the PM measuring module 30 at a timing at which the echo is not detected, based on the azimuth range selected by the azimuth selecting module 62. The PM chart generating module 64 generates charts showing time transitions of the measured performance of the radar unit 10. The performance determining module 65 determines whether it is required to replace the component of the radar transmitter 11 or the radar receiver 13 based on the charts generated by the PM chart generating module 64. The notifier 66 notifies that it is required to replace the component of either one of the transmission and reception systems by displaying it on the display unit 40. The processing performed by the performance determining module 65 is described later in detail.

The PM memory 51 stores the performance of the radar unit 10 measured by the PM unit 20 by associating it with a measured timing.

The communication interface 52 is connectable with, for example, a server provided in the ship by using a communication line (e.g., a wired LAN, a wireless LAN, a communication satellite, or a mobile phone line), and a land station where data management is performed.

Figure 3:
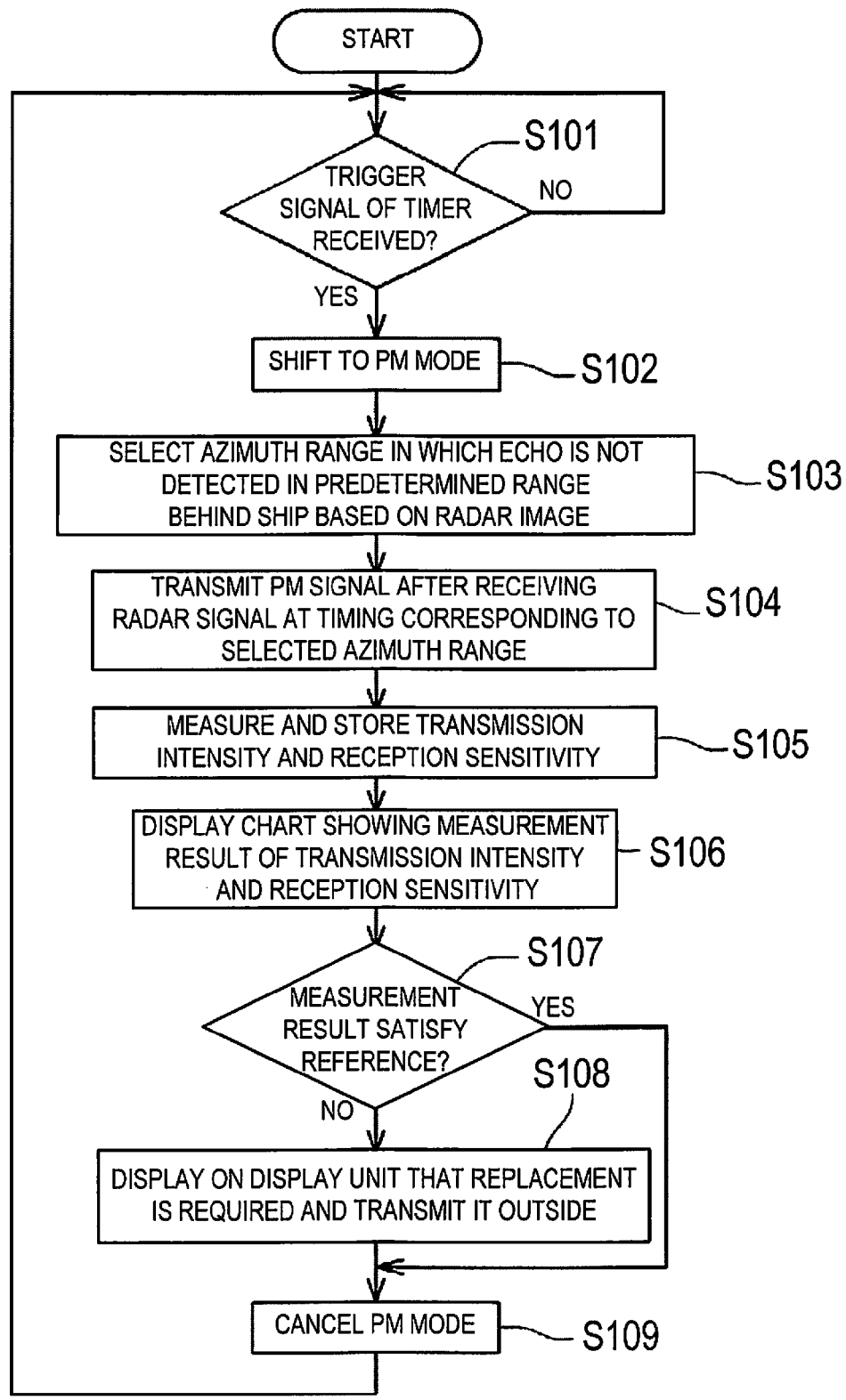
FIG. 3 is a flowchart illustrating processing for measuring performance of the radar apparatus.

Next, the processing in which the radar apparatus 1 of this embodiment measures the performance of the radar unit 10, particularly the timing to perform the processing, is described in detail with reference to the flowchart of FIG. 3.

The timer 61, while the radar image is generated by the radar apparatus 1, generates the trigger signal at a predetermined time interval, such as every 24 hours (S101). When the trigger signal is generated, the radar apparatus 1 determines whether to shift to a PM mode in which the performance of the radar unit 10 is measured (S102).

Based on the radar image in the immediately previous scan generated by the radar image generating module 15 (the radar image based on the reflection wave(s) acquired by the radar antenna 12 in its immediately previous one full rotation), the azimuth selecting module 62 of the PM controller 50 seeks and selects an azimuth range in which the echo is not detected (S103, within the thin line in the FIG. 2, e.g., 5°) within a predetermined azimuth range behind the ship (within the broken line in FIG. 2, e.g., 60°). Since the reflection wave cannot be received while the PM signal is received, the PM measuring module 30 is operated while suspending the transmission of the radar signal for the azimuth range in which the echo from the target does not exist. Note that, when the echo is detected in all the azimuths within the range, the azimuth range with less number of echoes may be selected or the detecting operation may be repeated at a predetermined time interval until the azimuth range with no echo is detected. Moreover, the checking of the existence of the echo or the number of the echoes may be performed over a plurality of scans.

Moreover, the targeted range for selection is limited to the predetermined range behind the ship because the PM antenna 22 is disposed in the ship, rearward of the radar antenna 12. Since the importance of the target behind the ship is low, by disposing the PM antenna 22 as described above, the performance of the radar unit 10 can be measured while suppressing influence on the radar image.

Next, the PM antenna 22 receives the radar signal at a timing at which a rotational phase of the revolving radar antenna 12 matches the azimuth selected at S103. Then, the PM antenna 22 transmits the PM signal after receiving the radar signal (S104).

Figure 4:
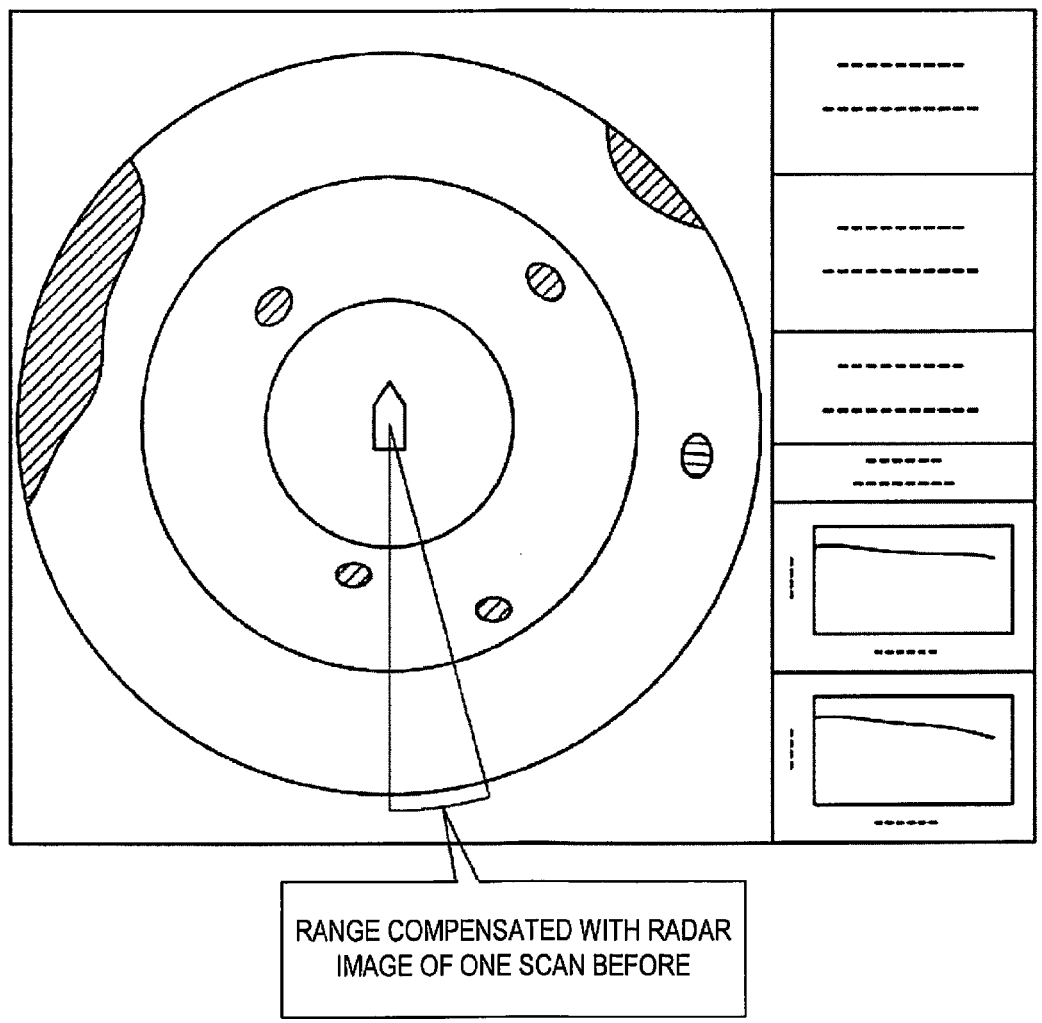
FIG. 4 is a view illustrating an image displayed on the display unit in a PM mode.

Note that, since the radar unit 10 performs the processing described above, the echo of the target in the azimuth range selected at S103 cannot be displayed (see FIG. 4). Thus, the compensation for the non-displayed echo is performed on the radar image as described later.

As described above, the PM measuring module 30 measures the transmission intensity based on the received radar signal, measures the reception sensitivity based on the received PM signal, and stores them in the PM memory 51 (S105).

Next, the PM chart generating module 64 of the PM controller 50 generates the charts showing the time transitions of the transmission intensity and the reception sensitivity based on the previously-measured transmission intensity and the previously-measured reception sensitivity and the latest transmission intensity and the reception sensitivity, and displays them on the display unit 40 (S106). Here, as illustrated in FIG. 4, the radar image generating module 15 compensates for the radar image corresponding to a period of time in which the echo of the target is not acquired due to the PM measurement (i.e., the azimuth range selected at S103) with the radar image obtained in the immediately previous scan. Thus, the display of the radar image is continued. Note that, the method of compensating for the azimuth range selected at S103 is arbitrary, and the radar image may be compensated based on, for example, data from a plurality of scans or data for azimuths close to the selected azimuth range. Further, the radar image may be compensated by receiving, from another radar apparatus connected with the radar apparatus of this embodiment via network, a reflection wave acquired by the other radar apparatus or data indicating a position of a target, and based on the reflection wave and the data.

Figure 5:
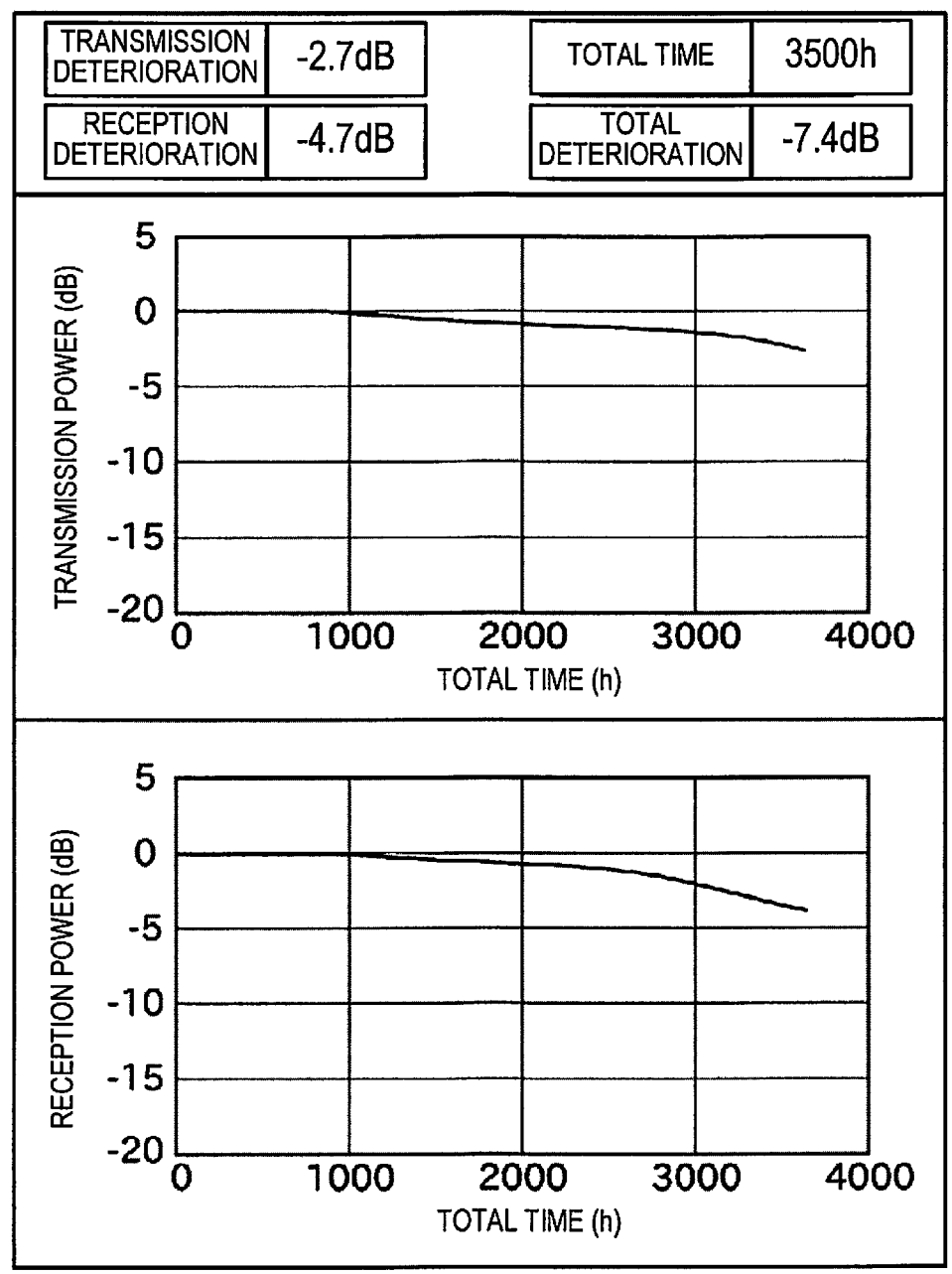
FIG. 5 is a view illustrating transitions of a transmission intensity and a reception sensitivity in the initial stage of operation of the radar apparatus, respectively.

Here, the charts generated by the PM chart generating module 64 are described with reference to FIG. 5. FIG. 5 is a view illustrating an example of the charts generated by the PM chart generating module 64.

As illustrated in FIG. 5, the charts include the chart about the transmission intensity and the chart about the reception sensitivity. Each chart shows a change of a deterioration degree (dB) as a total time since the radar unit 10 is activated for the first time after being installed in the ship changes. Moreover, above the charts, a deterioration degree of the current transmission intensity, a deterioration degree of the current reception sensitivity, the total time, and the total deterioration degree (the total degree of both of the deterioration degrees) are shown.

Next, the performance determining module 65 of the PM controller 50 determines whether the transmission intensity and the reception sensitivity satisfy a predetermined reference degree (reference level) based on, for example, the charts generated by the PM chart generating module 64 and the stored contents in the PM memory 51 (S107). In this embodiment, when the predetermined reference degree is satisfied, the component of either one of the radar transmitter 11 and the radar receiver does not need to be replaced, but when the predetermined reference degree is not satisfied, the component of either one of the radar transmitter and the radar receiver needs to be replaced.

Specifically, the performance determining module 65 determines the predetermined reference degree is satisfied when the total deterioration degree in the charts of FIG. 5 is −10 dB or higher. Note that, the determination may be performed for the transmission intensity and the reception sensitivity individually.

If the performance determining module 65 determines that the reference degree is satisfied, the PM controller 50 cancels the PM mode (S109), and returns back to the processing at S101 again.

Figure 6:
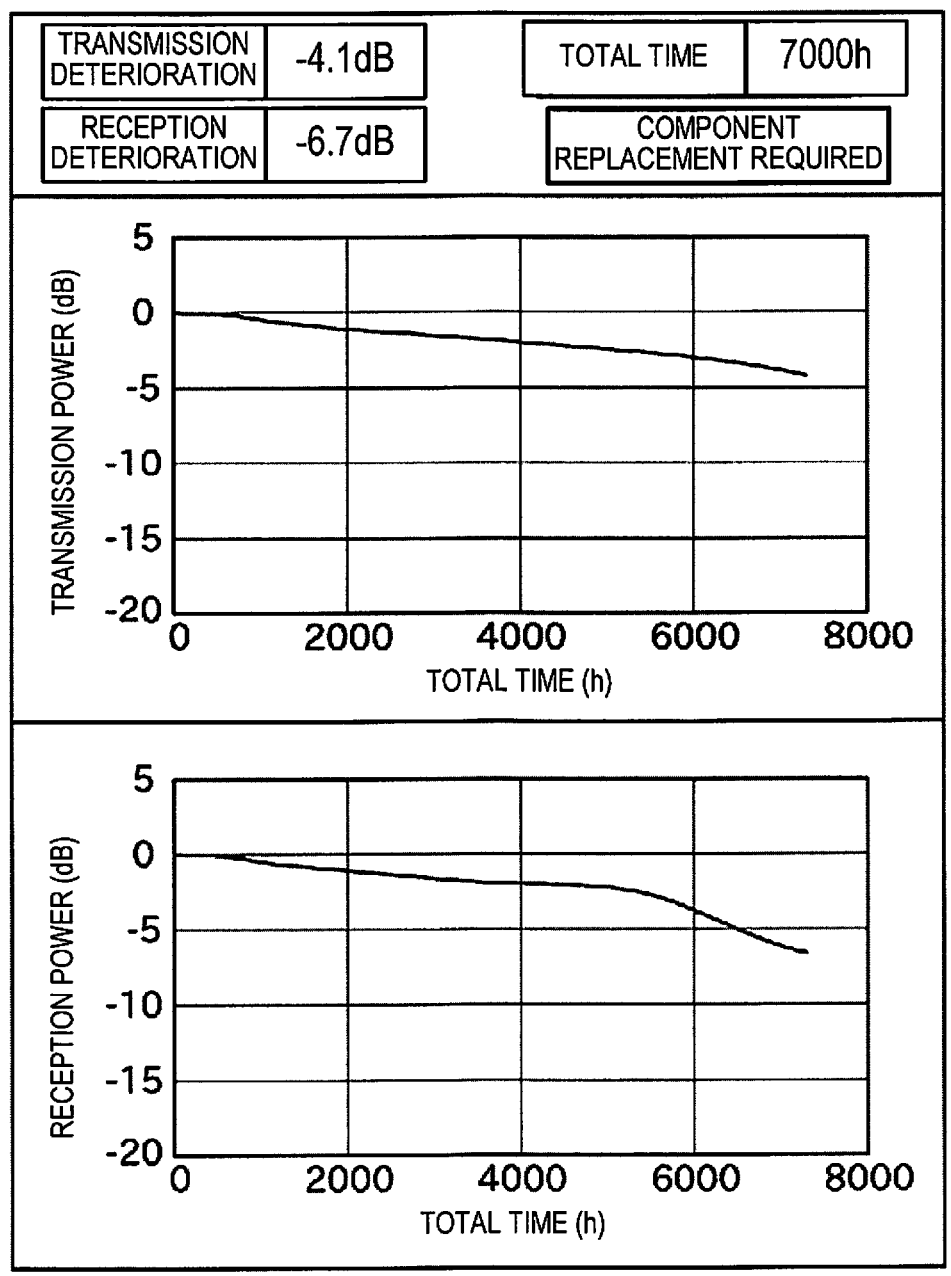
FIG. 6 illustrates charts showing the transitions of the transmission intensity and the reception sensitivity displayed when a component replacement is required, respectively.

On the other hand, if the performance determining module 65 determines that the reference degree is not satisfied, either one of the magnetron of the radar transmitter 11 and the electronic component of the radar receiver 13 needs to be replaced due to the deterioration. Therefore, the notifier 66 notifies that it is required to replace the component of either one of the transmission and reception systems by displaying it on the display unit 40 as illustrated in FIG. 6 (S108). Then the PM controller 50 cancels the PM mode and returns back to the processing at S101 again.

Note that, the notifier 66 may notify that it is required to replace the component with sound or light instead of displaying it on the display unit 40. Further, the notifier 66 can also transmit the measurement result of the performance or the determination result of the performance determining module 65 via the communication interface 52 to notify a repair shop of the radar apparatus 1 that it is required to replace the component. In this case, for example, a quote for a replacement component may be transmitted from the repair shop to an operator of the radar apparatus 1.

Moreover, in the description above, when it is required to replace the component, the notifier 66 notifies this status; however, if the performance determining module 65 can predict when it will be required to replace the component, based on the predicted replacing time, it may notify that it will soon be required to replace the component is close. For example, based on the charts generated by the PM chart generating module 64 and the tendency of the deterioration degree of the transmission intensity and the like which is obtained empirically, charts indicating how the performance of the radar unit 10 will change are predicted and thus, when it will be required to replace the component can be predicted based on these charts.

Moreover, the determination of the deterioration degree of the transmission intensity and the like described above and the chart display thereof may be performed by an instrument disposed outside the radar apparatus 1. In this case, the radar apparatus 1 outputs the obtained measurement result to the outside instrument.

As described above, the radar apparatus 1 periodically and automatically measures the transmission intensity and the reception sensitivity and, thus, can exert an effect that the aging deterioration can be grasped accurately.

As described above, the radar apparatus 1 of this embodiment includes the radar transmitter 11, the radar receiver 13, the radar image generating module 15, and the PM unit 20. The radar transmitter 11 transmits the radar signal via the radar antenna 12. The radar receiver 13 receives the reflection wave of the radar signal via the radar antenna 12. The radar image generating module 15 generates the radar image based on the reflection wave received by the radar receiver 13. The PM unit 20 measures the performances of the radar transmitter 11 and the radar receiver 13. The PM controller 50 causes the PM unit 20 to perform the measurement while the transmission of the radar signal is suspended.

Thus, the performances of the radar transmitter 11 and the radar receiver 13 can be measured without stopping the update of the radar image. Moreover, by suspending the transmission of the radar signal, the performance of the radar apparatus 1 can be measured at an arbitrary timing during the transception of the radar signal (e.g., a timing with less influence on the radar image).

Figure 7:
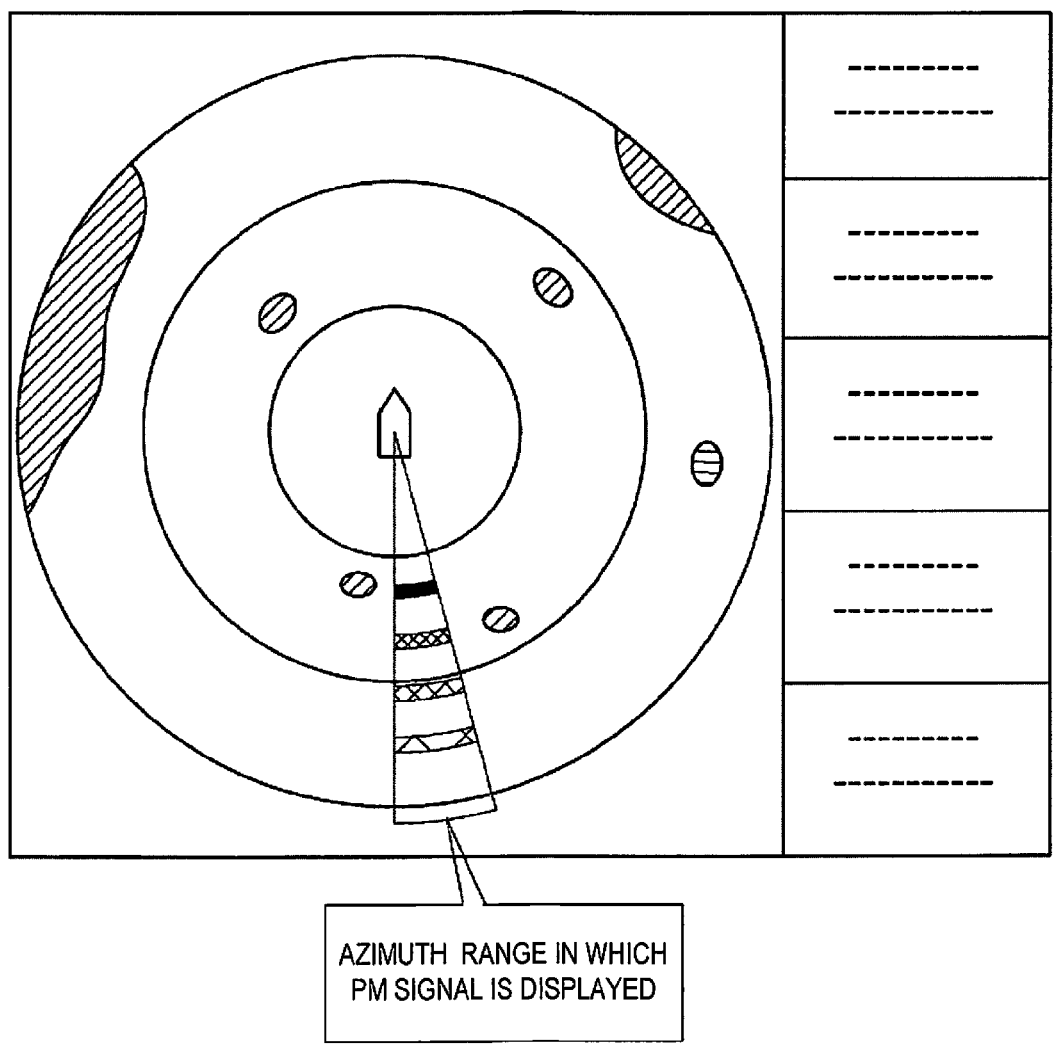
FIG. 7 is a view illustrating an image displayed on the display unit in a modification.

Next, a modification of the above embodiment is described. FIG. 7 is a view illustrating an image displayed on the display unit 40 in this modification.

In the above embodiment, the reception result of the PM signal is displayed as a chart, and therefore, the PM signal is not depicted within a radar display area (not included in the radar image) as it has been conventionally. However, as illustrated in FIG. 7, the PM signal may be depicted in the radar display area. Also in this case, the radar image generating module 15 can keep updating the radar image to the latest image.

Although the preferred embodiment and the modification of the present invention are described above, the above configuration may be modified as follows.

In the above embodiment, the azimuth range is selected at S103, and the performance of the radar unit 10 is measured at the timing corresponding to the selected azimuth range; however, a distance (e.g., a long distance where the importance of echoes is low) may be selected at S103, and the performance of the radar unit 10 may be measured at a timing corresponding to the distance.

The arrangement of the charts and the values to be displayed in FIGS. 5 and 6 are arbitrary and may suitably be changed. For example, the transmission intensity and the reception sensitivity may be displayed in one chart.

In the above embodiment, the example in which the present invention is applied to a pulse radar is described; however, instead of the pulse radar, a CW (Continuous Wave) radar or a pulse Doppler radar may be used. Moreover, a radar apparatus having a configuration in which the radar antenna does not rotate may be used. For example, with a radar apparatus having a configuration with antenna element(s) over the whole circumference or a radar apparatus which detects only in a specified direction (e.g., front), the radar antenna does not need to rotate.

The present invention is not limited to be applied to a radar apparatus for ships, but may also be applied to a radar apparatus which is installed on a beacon and monitors a position of a movable body. Moreover, the radar apparatus to which the present invention is applied may be installed in movable bodies other than ships, for example, aircrafts or automobiles.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radar apparatus, comprising:
   a transmitter configured to transmit radar signals via a radar antenna;
   a receiver configured to receive reflection waves that are echoes of the radar signals, via the radar antenna;
   a radar image generating module configured to generate a radar image based on the reflection waves received by the receiver;
   a performance monitor configured to measure performance of at least one of the transmitter and the receiver; and
   a controller configured to cause the performance monitor to perform the measurement while the transmission of the radar signals is suspended.

2. The radar apparatus of claim 1, wherein the controller recognizes, in the radar image, either one of an azimuth range and a distance in the radar image where the echo is not detected or the number of detected echoes is less than other azimuths or distances, and at a timing corresponding to the either one of the azimuth range and the distance, the controller causes the performance monitor to perform the measurement.

3. The radar apparatus of claim 2, wherein the controller detects the either one of the azimuth range and the distance where the echo is not detected or the number of detected echoes is less than other azimuths or distances based on the radar image data obtained in a scan immediately before a latest scan performed by the radar apparatus.

4. The radar apparatus of claim 1, wherein the performance monitor transmits a performance signal for measuring the performance of the receiver, and
   wherein the radar image generating module compensates for the radar image that is not acquired while the performance signal is transmitted, with other data.

5. The radar apparatus of claim 4, wherein the other data is radar image data obtained in a scan immediately before a latest scan performed by the radar apparatus.

6. The radar apparatus of claim 1, further comprising a display unit configured to display, along with the radar image generated by the radar image generating module, a chart indicating a time transition of the measured performance of at least one of the transmitter and the receiver.

7. The radar apparatus of claim 1, further comprising:
   a performance determining module configured to determine whether the performance of at least one of the transmitter and the receiver measured by the performance monitor satisfies a predetermined reference level; and
   a notifier configured to, when the performance determining module determines that the predetermined reference level is not satisfied, notify that the at least one of the transmitter and the receiver requires to be replaced or soon to be replaced.

8. The radar apparatus of claim 7, further comprising a communication interface,
wherein the notifier transmits at least one of the measurement result of the performance monitor and the determination result of the performance determining module outside via a communication line.

9. The radar apparatus of claim 1, wherein the radar apparatus is to be installed in a movable body, and
wherein the performance monitor is disposed in the movable body, rearward of the radar antenna.

10. The radar apparatus of claim 1, further comprising a timer in which a timing to measure the performance of at least one of the transmitter and the receiver is set in advance and configured to, when the timing comes, output a signal indicating that it is the timing to measure, to the performance monitor.

11. A method of measuring radar performance, comprising:
transmitting radar signals via a radar antenna;
receiving reflection waves that are echoes of the radar signals, via the radar antenna;
generating a radar image based on the received reflection waves; and
measuring performance of at least one of a transmitter and a receiver of the radar signals while the transmission of the radar signals is suspended.

12. The method of measuring radar performance of claim 11, further comprising:
recognizing, in the radar image, either one of an azimuth range and a distance in the radar image where the echo is not detected or the number of detected echoes is less than other azimuths or distances, and at a timing corresponding to the either one of the azimuth range and the distance; and
the measuring performance of at least one of a transmitter and a receiver of the radar signals while at the timing.

13. The method of measuring radar performance of claim 12, wherein the recognizing the either one of the azimuth range and the distance where the echo is not detected or the number of detected echoes is less than other azimuths or distances based on the radar image data obtained in a scan immediately before a latest scan performed by the radar apparatus.

14. The method of measuring radar performance of claim 11, wherein the generating the radar image is performed that the radar image which is not acquired while the performance is measured is compensated with other data.

15. The method of measuring radar performance of claim 14, wherein the other data is radar image data obtained in a scan immediately before a latest scan performed by the radar apparatus.

16. The method of measuring radar performance of claim 11, further comprising displaying a chart indicating a time transition of the measured performance of at least one of the transmitter and the receiver.

17. The method of measuring radar performance of claim 11, further comprising:
determining whether the performance of at least one of the transmitter and the receiver satisfies a predetermined reference level; and
notifying at least one of the transmitter and the receiver required to be replaced or soon to be replaced when the predetermined reference level is not satisfied.

18. The method of measuring radar performance of claim 17, further comprising:
transmitting at least one of the measurement result of the performance and the determination result of the performance to outside via a communication line.

* * * * *